July 12, 1966     D. A. DEISINGER     3,260,940
RADIOSONDE FOR WEATHER TELEMETERING
Filed July 3, 1951     5 Sheets-Sheet 1
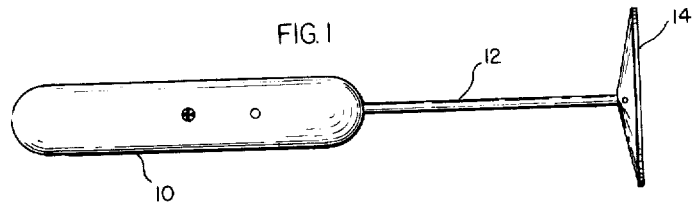
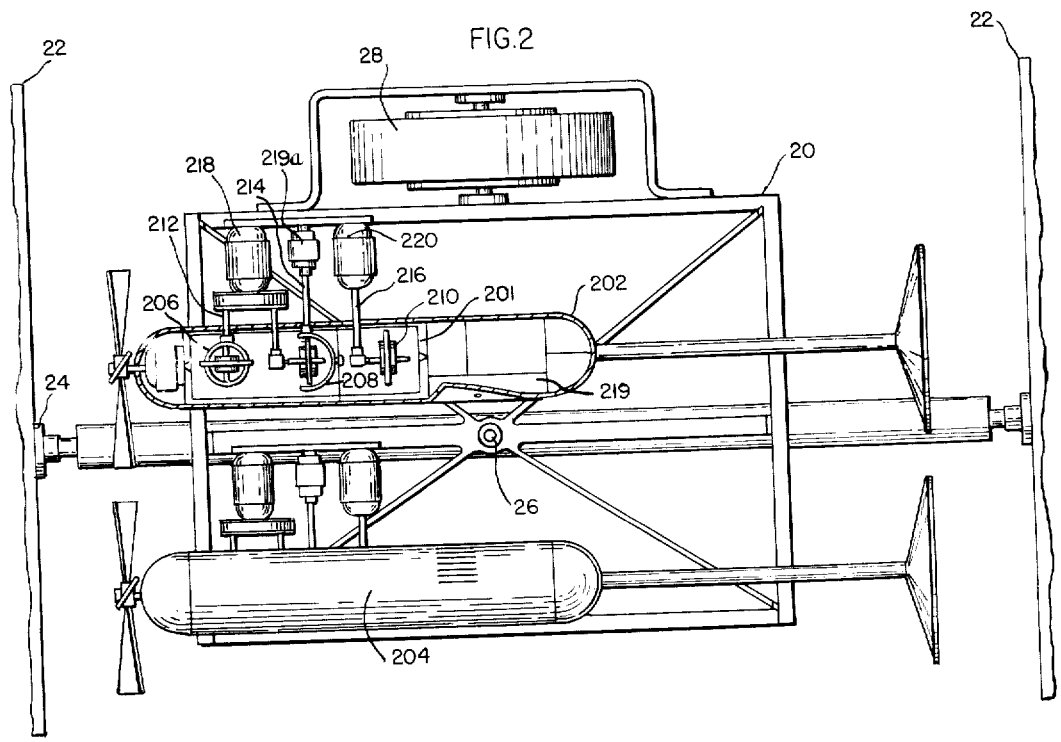
*INVENTOR.*
DELBERT A. DEISINGER
BY
*Harry M. Saragovitz*
*Attorney*

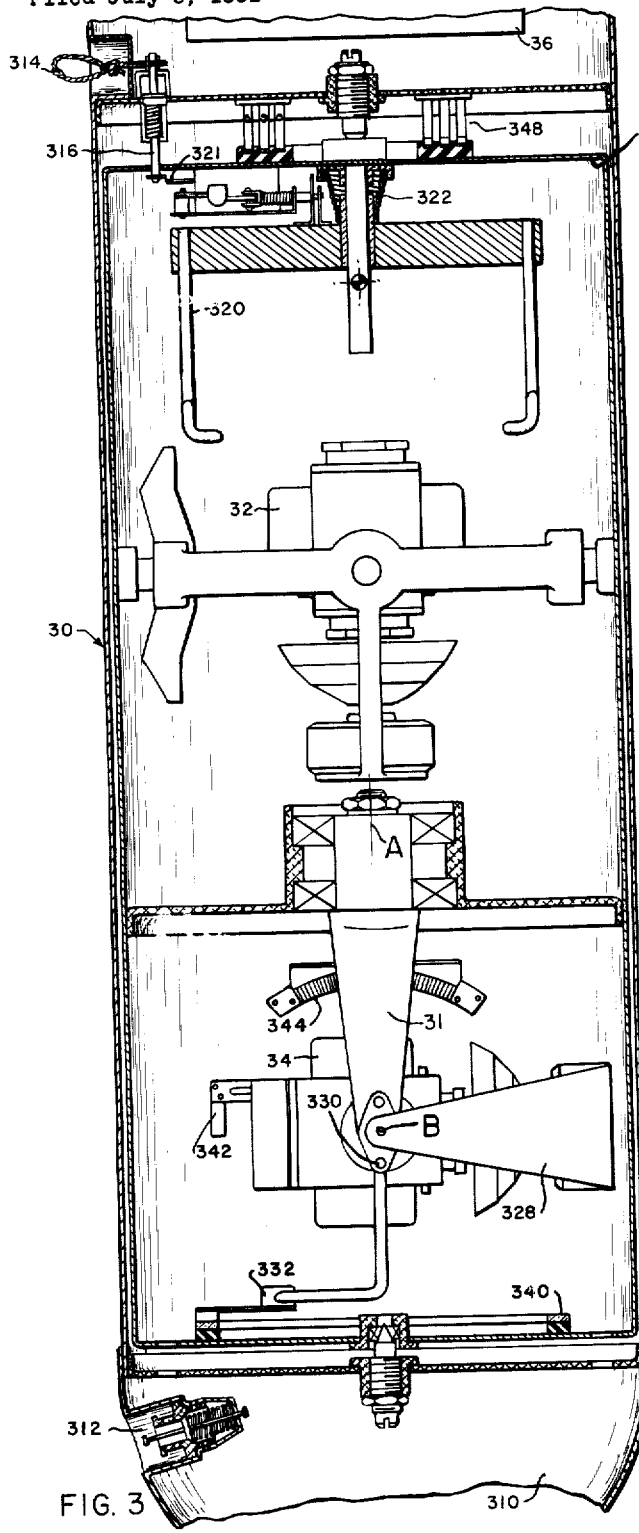
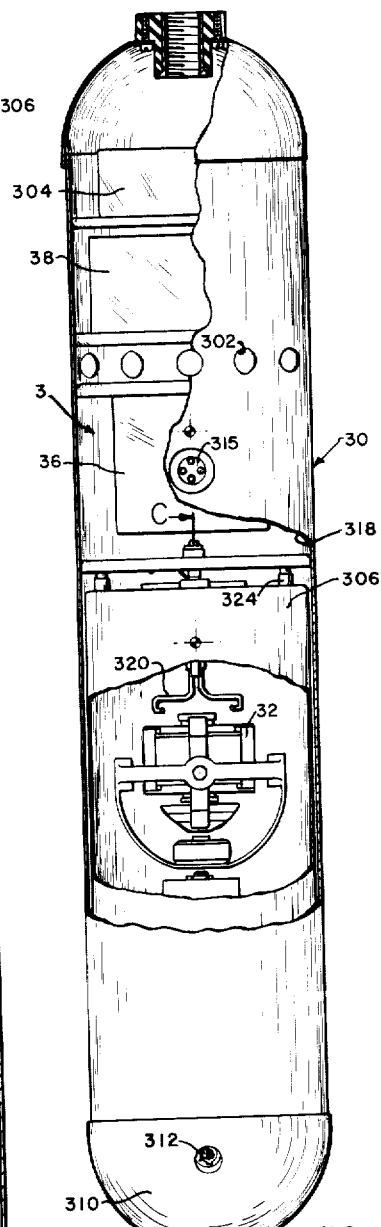
FIG. 3
FIG. 4
INVENTOR.
DELBERT A. DEISINGER

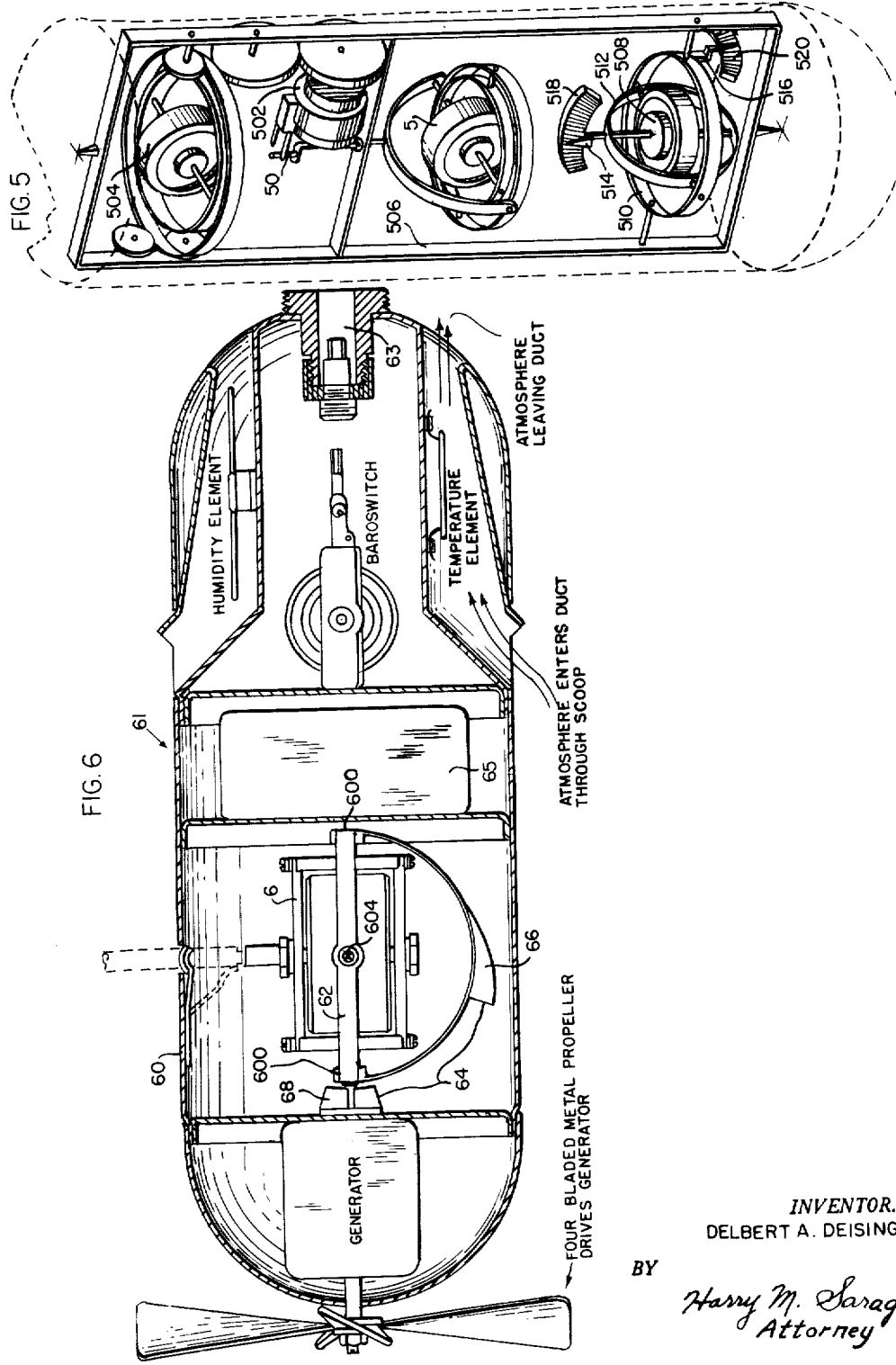

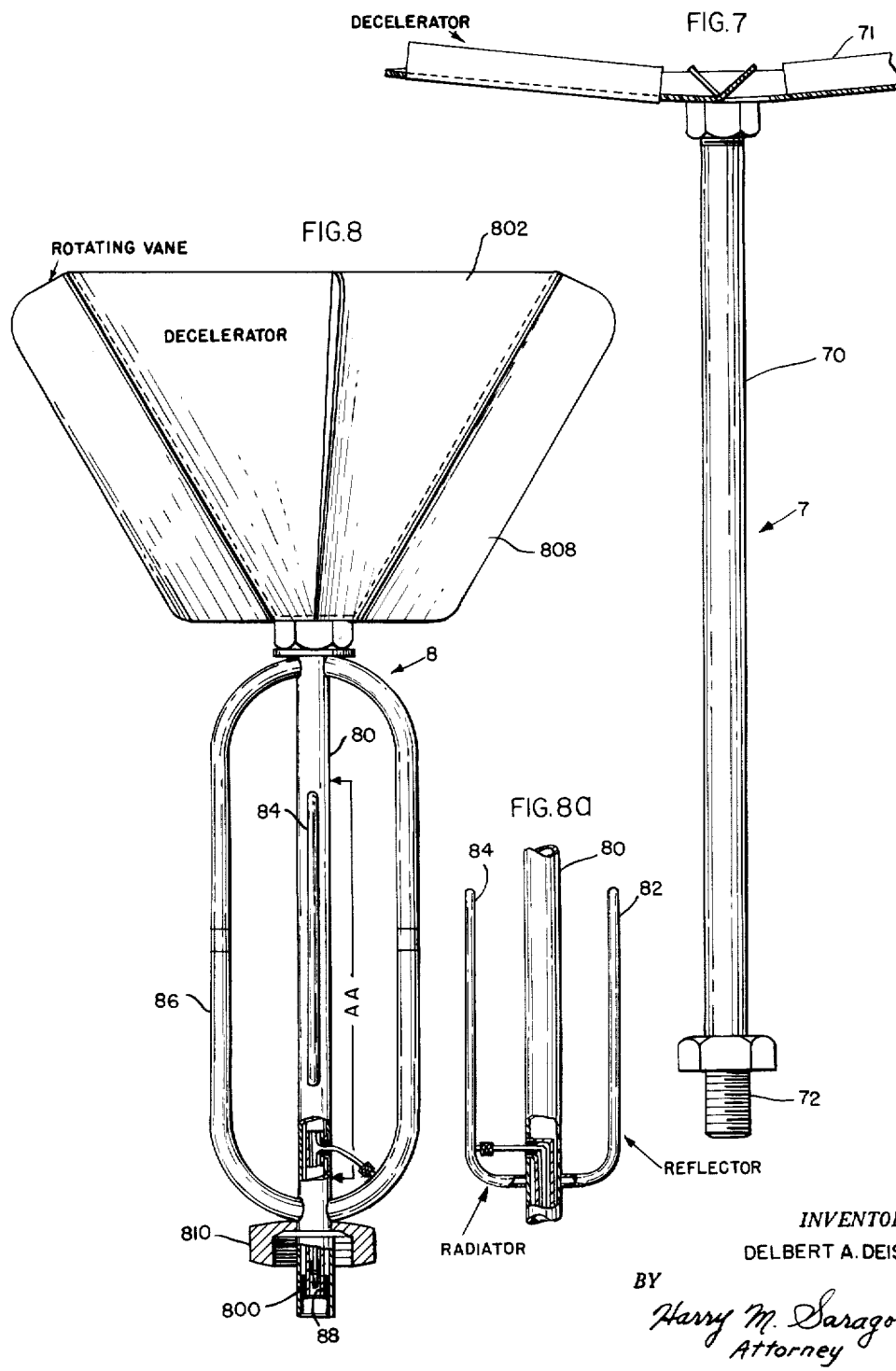

July 12, 1966
D. A. DEISINGER
3,260,940
RADIOSONDE FOR WEATHER TELEMETERING
Filed July 3, 1951
5 Sheets-Sheet 5
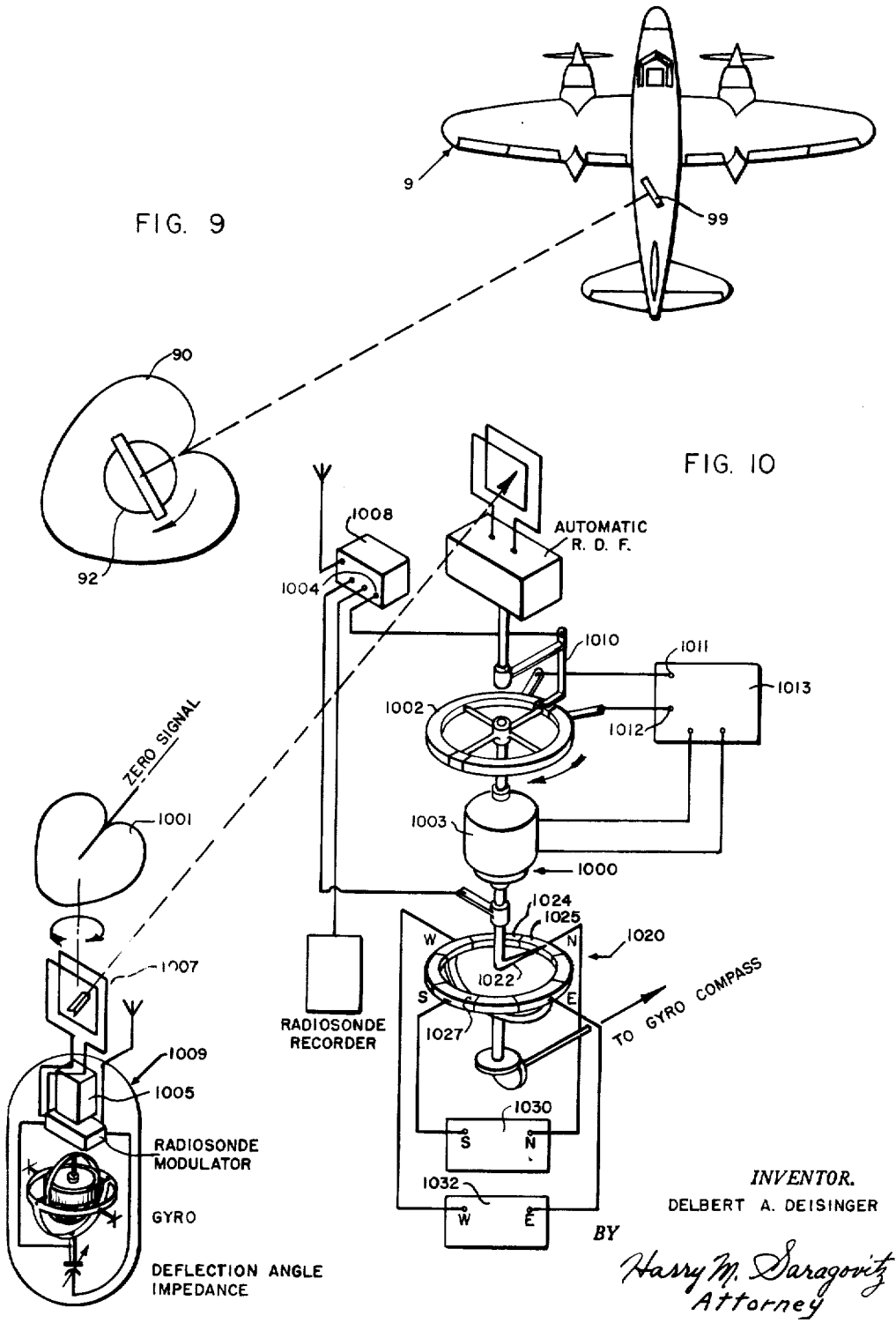
INVENTOR.
DELBERT A. DEISINGER
BY
Harry M. Saragovitz
Attorney 3,260,940
RADIOSONDE FOR WEATHER TELEMETERING
Delbert A. Deisinger, West Long Branch, N.J., assignor to the United States of America as represented by the Secretary of the Army
Filed July 3, 1951, Ser. No. 235,085
6 Claims. (Cl. 325—113)

The invention described herein may be manufactured and used by or for the Government for governmental purposes, without the payment of any royalty thereon.

The present invention relates to a device which upon release from an airborne vessel and during its subsequent fall to earth transmits prevailing meteorological conditions, and more particularly to the combination of such a device with a receiver within the aribone vessel for receiving the transmitted information.

An object of this invention is to provide a system and apparatus for determining the direction and velocities of winds as well as the temperature, humidity, and other meteorological conditions over otherwise inaccessible areas, such as enemy territory in time of war.

Another object of this invention is to provide an instrument, or device, which may hereinafter be referred to as "kaysonde," which may be dropped from an airborne vessel such as an airplane in flight, and which during its subsequent fall to earth will measure the derivative of wind velocity with respect to height, and also determine temperature, pressure, relative humidity and other characteristics of the atmosphere, such as radioactivity, and will transmit such information to suitable receiving equipment in the vessel.

These and other objects of the present invention will become apparent from the description and claims that follow.

In accordance with this invention the direction and/or velocity of winds prevailing over a particular area are determined by means of a device which may be released over the area from an airborne vessel such as an airplane or a balloon. The device is, in general, bomb-shaped and designed to be of a limited free falling type that is provided with vanes for facilitating its rotation as it falls. The bomb-shaped device generally contains instruments for measuring the prevailing atmospheric and radiological conditions, and in particular, means, such as gyroscopic means, for measuring the tilt of the device as it falls. The device is normally provided with telemetering means such as a radio transmitter for transmitting the acquired information from it to a receiver-computer located at a convenient position, usually within the craft from which it was released. The receiver-computer determines the velocity and the direction of prevailing winds from the tilt data.

The wind direction may be determined by means of an antenna consisting of a loop associated with a vertical radiator, so designed as to produce a cardioid pattern in azimuth. Since this antenna is rigidly fixed to the kaysonde, the radiation pattern rotates and the radio signal received at the airplane (or other receiver position) drops to zero intensity once during each kaysonde revolution. The instant of zero signal provides the index by which the orientation of the kaysonde is detected by the computing apparatus provided at the receiver.

The use of a Doppler radar to determine the amount of drift when the kaysonde approaches the surface of the earth is optional with the present invention. The Doppler radar determines a check point which may be used in interpreting the accuracy of the information computed from the tilt of the kaysonde during its fall to earth. In computing the velocity of the winds from the tilt data as measured by the device of the present invention it is necessary to know wind velocity at one particular altitude. This altitude is usually that at which the kaysonde is released for fall, or it may be ground level. The velocity of the wind at the release height may be determined by known radar methods. The velocity at ground level may, as explained, be determined by a Doppler radar.

The present invention will be more clearly understood by reference to the appended drawings wherein:

FIG. 1 is a vertical view of a kaysonde in accordance with the present invention showing the general external characteristics of a typical sonde, FIG. 2 shows an arrangement for conveying the kaysonde of this invention in the bomb bay of an airplane from which it may be released and set into operation, FIG. 3 is an enlarged sectional view of a two gyroscope kaysonde of this invention taken along the section c—c of FIG. 4, FIG. 4 is a top view of the kaysonde shown in FIG. 3 broken away in part to show the interior thereof, FIG. 5 is a schematic of a three gyroscope kaysonde in accordance with this invention, FIG. 6 is a schematic of a single gyroscope kaysonde in accordance with another embodiment of this invention, FIGS. 7 and 8 show various tail assemblies that may be used in conjunction with the various kaysonde bodies disclosed herein, FIG. 8–A is a view along the section A—A of FIG. 8, FIG. 9 is a schematic of a system for determining the orientation of the kaysonde, FIG. 10 is a schematic of a single gyroscope kaysonde and airborne receiver computer of this invention.

As shown in FIG. 1 the kaysonde consists in general of a housing 10 about 6 inches in diameter by 30 inches long, a beam 12 attached to the end of the housing, and a tail 14 designed as an air scoop mounted on the end of the beam. Within the housing 10 is an instrument section (not shown) containing a gyroscope or gyroscopes, batteries or a generator, a baroswitch, temperature element, humidity element, etc., and, in certain designs, a Doppler radar. The weight of the instrument section and housing is, in general, about 25 pounds. The tail section is supported at a distance of about 34 inches from the center of gravity of the whole kaysonde. The tail preferably consists of a scoop designed to provide sufficient drag to equal the weight of the kaysonde when falling at a velocity of approximately 100 m.p.h. and from an initial height of about 20,000 feet.

It is preferred to launch the kaysonde from an aircraft in flight. A rack 20, as shown in FIG. 2, is designed for installation in the bomb bay 22 of the aircraft. This launching platform or rack 20 contains two bearings 24, 26 at right angles to each other, located normally in the horizontal plane. A vertical (vertical spin axis) gyroscope 28 is attached to this platform so that it will remain horizontal regardless of maneuvers of the airplane. The platform must, however, rotate in azimuth as the plane changes its course. The rack 20 is designed to carry four kaysondes, two of which 202, 204 are shown. Kaysonde 202 is shown in schematic to illustrate the operation of the launching mechanism. The kaysondes are carried in a horizontal position so that when dropped from the airplane they receive the impact of the slip stream without experiencing angular accelerations. The gyroscopes 206, 208 and 210 are connected by suitable shafts 212, 214 and 216 to motors, 218, and 220 permanently mounted on launching platform 20. The gyroscopes 206, 208, 210 are brought up to speed by motors 218 and 220 prior to launching and are then permitted to coast during the three to six minutes that the kaysonde is falling to earth. For some designs it may be desirable to install suitable air jets in the kaysonde to assist rotation so that the gyroscopes will continue to spin at the desired velocity for the entire fall. In the schematic shown elevation or vertical gyroscope 206 is held in a vertical position with respect to the launching platform 20 by the connecting drive shaft 212, and since the platform 20 itself is maintained in a horizontal position, the elevation gyroscope will be properly oriented when released. The azimuth gyroscope 208 is connected by suitable shafting 214 to a synchronous repeater (selsyn) 219a which is in turn driven by a master azimuth gyroscope (not shown) in the airplane. By this means the azimuth gyroscope is oriented with respect to true north prior to its release from the plane. As the airplane changes its course the selsyn links cause the azimuth gyroscopes in the various kaysondes in platform 20 to remain oriented with the master azimuth gyroscope. Gyroscope 210 is a reactor gyroscope which prevents rotation of the gyro-compartment 201. The operation of kaysonde 204 is the same as that of 202, and the remaining two kaysondes not seen in the figure.

FIGS. 3 and 4 show longitudinal views of a two gyroscope kaysonde. The instrument section 3 of kaysonde 30 contains two gyroscopes 32, and 34, batteries 36, baroswitch 38, temperature and humidity elements 302, and a radio transmitter 304. The two gyroscopes 32 and 34 employed in this system permit readings to be taken independently of the position of the kaysonde launching aircraft. The azimuth gyroscope 32 serves the function of maintaining a positive orientation of the gyroscope compartment 306 of the kaysonde 30. The vertical gyroscope 34 is used to measure the deflections of the sonde from the vertical. During the time of fall that the kaysonde 30 experiences a horizontal wind with respect to itself the vertical angle between the axis of the kaysonde and the axis of the vertical gyroscope constitutes a measure of the relative magnitude of the horizontal relative wind with respect to the rate of fall of the kaysonde, while the vertical plane containing this angle defines the direction of this relative wind. Radio transmitter 304 is incorporated in the kaysonde 30 to operate at a frequency of about 400 mc. This transmitter may for example, radiate a signal containing five or more sub-carriers each modulated to carry one type of data such as temperature, pressure, humidity, elevation angle and azimuth of the kaysonde, and/or etc. Other means of transmitting any or all of the data recorded by the sonde may also be employed.

The angle indicating system of the embodiment of this invention shown in FIGS. 3 and 4 measures two angles; namely (a) the vertical angle between the axis of the vertical gyroscope 34 and the principal axis of the kaysonde, and (b) the azimuth of the vertical plane containing this angle. These angles are measured by means of two gyroscopes, vertical gyroscope 34 and azimuth gyroscope 32. Both gyroscopes are brought up to speed by their driving motors a sufficient length of time prior to launching the kaysonde (see FIG. 2). By the time of launching the two gyroscopes 32 and 34 in the kaysonde 30 will have been completely oriented, one spin axis being vertical and the other being horizontal and having a true north-south azimuth. The transmitter 304 will also have been warmed up and will be in operation. The forward portion 310 of the sonde will have been evacuated to about one millimeter through a suction line (not shown) attached to the vacuum valve 312. This is done to reduce to a minimum the drag of the kaysonde upon the gyrocompartment 306.

In launching the sonde shown in FIGS. 3 and 4, the vacuum line (not shown) is pulled away from the vacuum valve 312 and the latter closes, maintaining the vacuum. The pull release on the center of the sonde 314 is also extracted, disconnecting the locking plunger 316. This action leaves the gyrocompartment free to remain at angular rest while the shell 318 of the kaysonde rotates about it. Release of the plunger 316 also releases the caging mechanism 320 which is moved sufficiently under the force of coil spring 322 to disconnect the momentary contacts 324 which previously supplied power to drive the gyroscopes, electromagnets, etc. During this same interval of the launching operation the four-contact power connector is also pulled away from the sonde (see four-contact slip connector 315), disconnecting the arming voltages.

When the kaysonde is launched it drops with its principal axis horizontal until the bomb-bay of the airplane from which it is launched (if it is launched from an airplane) has been cleared. After the sonde has cleared the bomb-bay it is traveling horizontally at the velocity at which the airplane was flying (assume 300 m.p.h.) and is immediately decelerated by the air drag acting upon the tail (see FIGS. 7 and 8). This initial deceleration is of the order of 9 g and very quickly reduces the horizontal velocity of the sonde. The kaysonde simultaneously begins to accelerate toward the earth under the influence of gravity, and gradually assumes a condition of falling vertically with its axis perpendicular to the surface of the earth, assuming there is no change in horizontal wind velocity.

During the period that the kaysonde is changing its orientation from horizontal to vertical, the gyroscopes 32 and 34 are free, due to their universal mounting, to retain their original orientations. During this period the kaysonde is given angular acceleration about its principal axis by the impellers built into the tail. The design is such as to give a rotational speed of about 120 r.p.m. at equilibrium. The gyrocompartment 306 is free to remain at rest, but due to friction will also assume some angular momentum. After a period of about ten seconds, the sonde will have approached a vertical orientation within 3°, and by operation of the timer 321, the caging mechanism will be fully released to cage the azimuth gyroscope 32. During this caging operation the gyrocompartment 306 is arrested in its angular rotation and locked to the horizontal axis of the azimuth gyroscope. After this action is accomplished the gyrocompartment possesses a true orientation and will be held in this position by the azimuth gyro.

By the time the kaysonde 30 has assumed its vertical orientation, the vertical registering gyroscope 34 will be pointing in a direction coinciding closely with the major axis of the sonde. (The electromagnet 328 is suspended 60 degrees above the vertical by pin 330 so it does not interfere with contactor 332. It is to be noted that the bearings supporting magnet 328 are separate from those supporting the gyroscope.) From this time onward, every departure of the principal axis of the kaysonde from the vertical is registered against the stable axis of the vertical gyroscope. Assume that the nose of the kaysonde departs toward the northeast because of the presence of a northeasterly relative wind. The gimbal of the vertical gyroscope will rotate about axis A until axis B is perpendicular to the northeast azimuth. (Due to the stable vertical spin axis of gyro 34 axis B must remain in a horizontal position, and therefore, gimbal 31 must rotate about axis A until axis B is perpendicular to the direction of the relative wind.) Contactor 332 which is connected to gimbal 31 and extends perpendicularly from axis B will then occupy the radial position upon rheostat 340 corresponding to the particular azimuth of the relative wind. The vertical gyroscope will also rotate about its axis B, or, more properly, the kaysonde will rotate about the axis B until the angle between the stable vertical spin axis of the gyroscope and the major axis of the kaysonde are equal to the departure of the axis of the kaysonde from the vertical. Contactor 342 will then register a position upon rheostat 344, indicating the true vertical angle. The resistances established on rheostats 344 and 340 are communicated through slip rings 348 to the modulator portion of the transmitter, and audio frequencies are transmitted to the airplane indicating the angular position of the kaysonde, both in elevation and azimuth. If the spin axis of the kaysonde coincides exactly with the mechanical axis of the instrument, and if the kaysonde is flightstable, both the position of contactor 332 and that of 342 will remain constant as the kaysonde rotates about its axis, assuming the relative wind remains constant with respect to the sonde. (A constant relative wind requires a true wind constantly increasing in speed with decreasing altitude.) Should the kaysonde be non-symmetrical so as to travel through the air with its major axis non-coincident with the direction of the total relative air flow, both contactors 342 and 332 will oscillate about the true angular positions. These oscillations will also occur to the extent that the sonde is not flightstable. Since the kaysonde rotates about its axis, the true angles may be obtained by removing the oscillating values.

The 3-gyroscope kaysonde shown in FIG. 5 is a revision of the 2-gyroscope model containing many novel features intended both to improve the accuracy and to reduce the cost of the expendable equipment. The principle of operation of this equipment is similar to that of the sonde shown in FIGS. 3 and 4. The chief features of this sonde are described in the following paragraphs, but those features which are not different from the 2-gyroscope sonde are not repeated.

In the 3-gyroscope sonde shown in FIG. 5 the azimuth gyro 5 operates a contact switch 50 which, in turn, drives a simple servo mechanism 502 to keep the gyrocompartment 506 zeroed in azimuth by working against a simple auxiliary or reactor gyroscope 504. Gyroscope 504 provides the necessary angular momentum to overcome the frictional losses developed in the bearings of the gyrocompartment. This arrangement provides sufficient angular momentum to hold the gyrocompartment 506 oriented during the entire period of the sonde's fall to earth. With orientation of the gyroscope compartment 506 established, the vertical registering gyro 508 is able to indicate both north-south and east-west deflection components of the axis of the kaysonde with respect to the vertical. This is a departure from the angular measuring system employed in the two-gyro kaysonde. In this sonde the axis of both gimbals 510 and 512 supporting the vertical gyroscope 508 are horizontal, whereas in the former sonde one axis was vertical. Since these horizontal axes are continuously oriented the north-south and east-west angular deflections are each indicated directly by rotation about one axis only so long as the angles are small. The angular deflections are detected by two contactors 514 and 516 moving upon two rheostats 518 and 520. These rheostats actuate modulating sections of the radio transmitter (not shown) and transmit to the airplane, the north-south component and the east-west component of the angular inclination of the kaysonde. This instrument has the advantage over the previous sonde in that angles are interpreted directly as north-south and east-west components rather than being interpreted as maximum angle of inclination and azimuth of this maximum angle. The process of computing the resultant data is believed to be simplified by this method of presentation.

The single-gyro kaysonde 61 illustrated in FIG. 6 is a simplified sonde intended to reduce cost. The device contains a single vertical gyroscope 6, which is brought up to speed by a motor in the airplane (not shown) prior to launching, and then coasts until the instrument reaches the ground (mounting in airplane is similar to FIG. 2). This kaysonde rotates about its vertical axis at 120 r.p.m. in the same manner as previous models. In this sonde, however, the entire gyroscope compartment rotates with the body of the kaysonde instead of remaining in a fixed orientation, as was the case with the other two sondes. The angular position of the outer gimbal 62 supporting the gyroscope 6 is measured by a condenser 64, by a rheostat or by other suitable indicating means. FIG. 6 shows the kaysonde 61 in the horizontal position prior to launching from the airplane. When falling vertically the rotor 66 of the condenser 64 engages the stator 68. When the kaysonde is deflected from the vertical by the action of a relative wind, its longitudinal axis assumes an angle with the spin axis of the gyroscope and remains constant as the kaysonde rotates. Under this condition the bearings 600 supporting the inner gimbal (not seen) will always be in one and the same horizontal plane as the kaysonde rotates about its longitudinal axis because the spin axis of the gyroscope remains truly vertical, but the bearings 604 supporting the outer gimbal 62 are fixed in the shell 60 of the kaysonde 61 and will travel in a plane perpendicular to the longitudinal axis of the kaysonde; that is, in a plane inclined to the horizontal at an angle equal to the deflection of the kaysonde from the vertical. As the kaysonde rotates, the outer gimbal 62 must oscillate about its supporting axis through bearings 604. The angle between the plane of this outer gimbal and the plane perpendicular to the major axis of the kaysonde will vary from zero, to a maximum in one direction, again to zero, then to a maximum in the reverse direction, and finally to the original zero as the kaysonde makes one complete rotation. The angles measured at the two maximum positions will be the true deflections of the axis of the kaysonde from the vertical spin axis of the gyroscope 6. The variation of the angular deflection of this gimbal 62 will follow a sine wave pattern. As this angular deflection varies, the capacitance across the condenser 64 in the kaysonde 61 will vary. The variation in capacitance of condenser 64 may be employed to frequency-modulate a high-frequency oscillator and thereby provide a means of telemetering the angular position of the gimbal via radio to the airplane. From the movement of the gimbal as previously described, it may be concluded that this modulation will be a sine wave function where frequency deviation will be a measure of the true deflection of the longitudinal axis of the kaysonde from the vertical axis of the gyroscope (this is insured by gyro 6). This signal is transmitted by means of radio transmitter 65 and received in the airplane and applied to the computing unit.

Means of indexing the azimuth of the single gyroscope kaysonde shown in FIG. 6 will be described with reference to FIGS. 9 and 10.

FIGS. 7, 8 and 8a show various tail assemblies for use in connection with the kaysondes of the herein disclosed invention. The tail assembly shown in FIG. 7 is particularly applicable for use with the two and three-gyroscope sondes shown in FIGS. 3, 4 and 5. Tail assembly 7 is utilized to decelerate the sonde in its fall to earth. In general it comprises a tail boom 70 (about 2 ft. in length) to which is secured deceleration fins 71. An end 72 of boom 70 is provided with threads for engagement with the sonde housing to which it is to be secured.

The tail assembly 8 shown in FIGS. 8 and 8a is constructed for particular use with the single-gyroscope sonde shown in FIG. 6. The assembly 8 comprises a tail boom 80 from which reflector 82 and radiator 84 (see FIG. 8a) extend, a loop antenna 86, coaxial cable 88 within the boom 80, a coaxial connector 800 for connecting the tail assembly to the coaxial connector in the sonde (such as 63 in FIG. 6), and a decelerator 802 consisting of vanes 808 for rotating the assembly. Coupling nut 810 is provided for insuring secure coupling of the tail assembly to the sonde.

Operation of a system for determining the orientation of a single gyro kinetic radiosonde represented by 92 (FIG. 9) or 1009 (FIG. 10), may be seen from reference to FIGS. 9 and 10 in connection with the other figures pertaining to the single-gyroscope sonde. It is to be understood that similar systems may be employed with any of the sondes of this invention.

The radio transmitter 1005 contained in the kaysonde 1009 (FIG. 10) feeds an antenna 1007 consisting of a loop associated with a vertical radiator (see FIG. 8), so designed as to produce a cardioid radiation pattern in azimuth. Since this antenna is rigidly fixed to the kaysonde, the radiation pattern 1001 (FIG. 10 or 90 FIG. 9) rotates as the kaysonde rotates and the radio signal received at the airplane 9 (FIG. 9) drops to zero intensity once during each revolution. The instant of zero signal provides the index by which the orientation of the kaysonde is detected by the computing apparatus 1000 (FIG. 10). A commutating rotor 1002 is located in the computer 1000 which is carried aboard the airplane and is driven at a speed equal to that at which the kaysonde is rotating by means herein described. At each instant when the radio signal drops to zero, due to the rotation of the cardioid radiation pattern, an impulse is delivered from terminal 1004 of the receiver 1008 to a brush 1010 riding on the commutating rotor 1002 and in turn through the rotor to either terminal 1011 or 1012 of the servo 1013 depending upon the phase position of the commutating rotor. Excited by this pulse the servo mechanism 1013 adjusts the speed of rotation of motor 1003 and hence both the speed of rotation and the phase position of the commutating rotor so that the rotor remains accurately synchronized and in phase with the angular position of the rotating kaysonde. A radio direction finder 99 (FIG. 9) is employed in the airplane to automatically track the kaysonde and determine its direction with respect to the axis of the airplane. From this information and the time of zero signal referred to above, the orientation of the kaysonde with respect to the axis of the airplane is determined by the computing mechanism and means are thus provided by which the orientation of the commutating rotor and the kaysonde are made to coincide. A distributor 1020 is mounted on the same shaft as the commutating rotor and therefore this distributor is also kept in orientation with the kaysonde. As previously indicated, a sine wave modulation is continuously received from the kaysonde indicating the deflection of this device from the vertical. This signal is applied to the distributor arm 1022. The stator 1024 of the distributor contains four pickup segments which are oriented with respect to true north by the gyro compass in the airplane. These pickup segments receive those portions of the modulation signal from the distributor arm corresponding to the north-south or the east-west components of the average deflection of the kaysonde. The data are integrated by suitable storage devices. As an example, the signal representing the angle of inclination of the kaysonde at an instant of time when the axis of the outer gimbal is in an east-west position, is applied, after suitable detection in which the transmitted frequency is converted to a representative voltage, to a north representing condenser 1025. This application is made while the distribution arm 1022 is moving through 60 degrees equally disposed either side of the true northerly position (the condenser segments 1025, etc., extend over a 60 degree arc). A similar disposition is made of the signal received while the distributor arm is rotating through 60 degrees diagonally opposite to the former position of the commutation, or at a time when the kaysonde has rotated through 180 degrees. In this case the voltage is applied to the south representing condenser. The north and the south condensers 1025 and 1027 therefore each receive a charge which is proportional to the corresponding deflection of the kaysonde in the north and in the south rotational positions. The difference between the two charges is proportional to twice the angular deflection of the vertical axis of the kaysonde from the vertical axis of the gyroscope in a north-south direction. A similar manipulation of signals is used to determine the east-west deflection of the kaysonde. North-south and east-west wind computers 1030 and 1032 are respectively connected to their corresponding condensers for computing the wind data received.

The sondes shown in FIG. 2 are shown to contain a Doppler radar. This Doppler radar is used to measure the drift of the kaysonde with respect to the ground during the last few seconds of fall. When the kaysonde is close to the surface of the earth, a radar signal transmitted from the antenna indicated at 219 (FIG. 2) is reflected back to the instrument from any irregular objects on the earth. Since the beam is designed to be deflected downward at an angle of about 15 degrees, the range of any echo will change due to the combined effect of the drift of the kaysonde and the change in its altitude. The change per second in range due to change in altitude will be the same for all directions (as the sonde rotates) if the sonde is not drifting with respect to the earth. If, however, the sonde is drifting with respect to the earth as caused by a wind, the rate of change of range of any target will be increased to a maximum by the effect of the wind in one angular position of the kaysonde, will be unaffected when the kaysonde has rotated 90 degrees, will be decreased an equal amount when the kaysonde has rotated another 90 degrees, and will again be unaffected 90 degrees later. Thus, if there is any drift of the kaysonde with respect to the earth, there will be a Doppler shift in frequency of varying amounts as the kaysonde rotates. The angular position of the kaysonde at which a maximum shift in frequency occurs will be the direction opposite to the wind, while that at which a minimum shift occurs will be the direction of the wind. By knowing both the magnitude of the Doppler shift in frequency and the direction in which the maximum occurs, the velocity of the sonde with respect to the earth during the last few seconds of fall can be determined and applied as a modulation to the radio transmitter and telemetered to the airplane for interpretation.

The tilt of the sonde in its fall to earth will always be into the wind and is always determined by the relative wind at the various altitudes. It is to be remembered that the kaysonde is not a truly "free-falling" device, but rather that it "drifts" with the various winds and thus determines both the speed and the direction of the winds at various altitudes as it falls.

As many apparently widely different embodiments of this invention may be made without departing from the spirit and scope hereof; it is to be remembered that the invention is not limited to its specific embodiments except as defined in the appended claims.

What is claimed is:

1. A device which upon release from an airborne vessel and during its subsequent fall to earth transmits prevailing meteorological conditions, said device comprising in combination a bomb-shaped housing, at least one gyroscope within said housing having a stabilized spin axis, tilt measuring means operatively associated with said gyroscope for measuring the tilt of said device relative to said spin axis due to the velocity of winds prevailing during said fall to earth, and means connected to said tilt measuring means for transmitting said tilt data from said device.

2. A device which upon release from an airborne vessel and during its subsequent fall to earth transmits prevailing meteorological conditions, said device comprising in combination a bomb-shaped housing freely rotatable about its longitudinal axis, a gyrocompartment within said housing containing at least one gyroscope for stabilizing said gyrocompartment in a true north-south azimuth, said gyroscope having operatively associated therewith indicating means for indicating the tilt of said device due to the velocity and direction of winds prevailing during said fall, and telemetering means connected to said indicating means for translating said tilt data into intelligence and for transmitting said intelligence from said device whereby the velocity and direction of winds prevailing during said fall may be disclosed at a distant point.

3. A device which upon release from an airborne vessel and during its subsequent fall to earth transmits prevailing meteorological conditions, said device comprising in combination a bomb-shaped housing freely rotatable about its longitudinal axis and having a tail section in the form of an air scoop secured to one end thereof, and within said housing a gyrocompartment containing an azimuth gyroscope having a horizontal spin axis for orienting said gyrocompartment in a true north-south direction, a vertical gyroscope having a vertical spin axis, registering means connected to co-operate with said vertical gyroscope for registering the angle of tilt and the orientation of said device due to the velocity and direction of winds prevailing during said fall, and external to said gyrocompartment means for converting said data into intelligence and transmitting said intelligence from said device.

4. The device defined by claim 3 including an auxiliary reactor gyroscope, a servo mechanism, and a contact switch connected to said azimuth gyroscope for actuating said servo mechanism to keep the gyrocompartment oriented in azimuth by working against said auxiliary gyroscope, said auxiliary gyroscope providing the necessary angular momentum to overcome the frictional losses developed in said gyrocompartment.

5. A device which upon release from an airborne vessel and during its subsequent fall to earth transmits prevailing meteorological conditions, said device comprising a freely rotatable bomb-shaped housing having a tail section in the form of an air scoop extending from one end thereof, said housing containing a universal registering gyroscope supported by an inner and an outer gimbal and having a vertical spin axis, said outer gimbal being supported by bearings fixed to said housing and having a first capacitor element secured thereto, a second capacitor element being fixed to said housing for coming into and out of register with said first capacitor element as said device rotates about a longitudinal axis angular to said vertical spin axis, the angle of said longitudinal axis with said vertical axis being determined by the velocity of winds prevailing during said fall, a high-frequency oscillator connected to said capacitor elements and modulated by the movement of said capacitor elements and a radio transmitter for transmitting the modulated signal from said device.

6. In a system for determining meteorological conditions over inaccessible ground areas the combination of a device which upon release from an airborne vessel and during its subsequent fall to earth transmits prevailing meteorological conditions and a receiver-computer within said airborne vessel for receiving said transmitted data, said device comprising a freely rotatable bomb-shaped housing having a tail section in the form of an air scoop extending from one end thereof, an antenna designed to produce a cardioid radiation pattern rigidly affixed to said housing, a universal registering gyroscope having a vertical spin axis inclosed within said housing and supported by an inner and an outer gimbal, said outer gimbal being supported by bearings fixed to said housing and having a fixed capacitor element secured thereto, a second capacitor element being fixed to said housing for coming into and out of register with said first capacitor element as said device rotates about a longitudinal axis angular to said vertical spin axis, the angle of said longitudinal axis with said vertical axis being determined by the velocity of winds prevailing during said fall, a high-frequency oscillator connected to said capacitor elements and modulated by the movement of said capacitor elements and a radio transmitter connected to said antenna for transmitting the modulated signal to said computer-receiver.

References Cited by the Examiner

UNITED STATES PATENTS

| 1,384,868 | 7/1921 | Sperry et al. | 250—2.5 |
| 1,745,714 | 2/1930 | Reynolds et al. | 250—1.2 |
| 1,780,369 | 11/1930 | Snow | 250—2.31 |
| 2,347,160 | 4/1944 | Wallace | 250—2.31 |
| 2,390,739 | 12/1945 | Scherbatskoy | 250—1.13 |

DAVID G. REDINBAUGH, *Primary Examiner.*

T. YAFFEE, NORMAN T. EVANS, *Examiners.*

G. W. GALLAGHER, J. W. CALDWELL,
*Assistant Examiners.*